United States Patent
Kim et al.

(10) Patent No.: US 10,598,237 B2
(45) Date of Patent: Mar. 24, 2020

(54) METHOD OF MANUFACTURING BRAKE DISC OF HETEROGENEOUS MATERIALS AND BRAKE DISC OF HETEROGENEOUS MATERIALS MANUFACTURED USING THE SAME

(71) Applicants: Hyundai Motor Company, Seoul (KR); Kia Motors Corporation, Seoul (KR)

(72) Inventors: Yoon Cheol Kim, Suwon-Si (KR); Jai Min Han, Suwon-si (KR); Yoon Joo Rhee, Suwon-si (KR); Min Gyun Chung, Seongnam-si (KR); Byung Chan Lee, Suwon-si (KR); Jae Young Lee, Yongin-si (KR)

(*) Notice: Subject to any disclaimer, the term of this patent is extended or adjusted under 35 U.S.C. 154(b) by 204 days.

(21) Appl. No.: 15/815,207

(22) Filed: Nov. 16, 2017

(65) Prior Publication Data
US 2018/0340585 A1  Nov. 29, 2018

(30) Foreign Application Priority Data
May 23, 2017 (KR) .................. 10-2017-0063308

(51) Int. Cl.
| | | |
|---|---|---|
| *C23C 8/26* | (2006.01) | |
| *F16D 65/12* | (2006.01) | |
| *B05D 7/14* | (2006.01) | |
| *B22D 19/00* | (2006.01) | |
| *C23C 8/28* | (2006.01) | |
| *C23C 8/80* | (2006.01) | |
| *F16D 65/02* | (2006.01) | |

(52) U.S. Cl.
CPC ............. *F16D 65/125* (2013.01); *B05D 7/14* (2013.01); *B22D 19/00* (2013.01); *C23C 8/26* (2013.01); *C23C 8/28* (2013.01); *C23C 8/80* (2013.01); *F16D 65/127* (2013.01); *F16D 2065/132* (2013.01); *F16D 2200/003* (2013.01); *F16D 2200/0013* (2013.01); *F16D 2250/0007* (2013.01); *F16D 2250/0015* (2013.01)

(58) Field of Classification Search
CPC ................ C23C 8/26; C23C 8/32; C23C 8/28
See application file for complete search history.

(56) References Cited

U.S. PATENT DOCUMENTS 10,274,031 B1 * 4/2019 Chung ................... C23C 8/02

FOREIGN PATENT DOCUMENTS

KR   10-1288830    7/2013

* cited by examiner

*Primary Examiner* — Jessee R Roe
(74) *Attorney, Agent, or Firm* — Morgan, Lewis & Bockius LLP

(57) ABSTRACT

A method of manufacturing a brake disc of heterogeneous materials, may include a disc device and a hub device formed in a cast-bonding manner using different materials, includes performing a first casting for casting the disc device using a grey cast-iron material, performing a preparation step by placing the disc device in a casting mold as an insert, performing a second casting for preparing a brake disc cast product by injecting molten aluminum alloy into the casting mold and casting the hub device to be cast-bonded to the disc device, and performing an oxynitriding process for forming an oxynitride layer by smoothing a surface of the brake disc cast product and performing heat treatment in a gaseous atmosphere at a temperature ranging from 425 to 500° C.

7 Claims, 7 Drawing Sheets

| CLASSIFICATION | MEASURED VALUE ($\mu$m) |
|---|---|
| Outboard Run-Out ——— | 171.3 |
| Inboard Run-Out —·—·— | 156.4 |
| DTV — — — | 29.1 |

| CLASSIFICATION | MEASURED VALUE (μm) |
|---|---|
| Outboard Run-Out ——— | 15.2 |
| Inboard Run-Out - - - - | 14.5 |
| DTV – – – – | 2.7 |

METHOD OF MANUFACTURING BRAKE DISC OF HETEROGENEOUS MATERIALS AND BRAKE DISC OF HETEROGENEOUS MATERIALS MANUFACTURED USING THE SAME

CROSS-REFERENCE(S) TO RELATED APPLICATIONS

The present application claims priority to Korean Patent Application No. 10-2017-0063308, filed on May 23, 2017, the entire contents of which is incorporated herein for all purposes by this reference.

BACKGROUND OF THE INVENTION

Field of the Invention

The present invention relates to a method of manufacturing a brake disc of heterogeneous materials and a brake disc of heterogeneous materials manufactured using the same, and, more particularly, to a method of manufacturing a brake disc of heterogeneous materials which is configured for improved durability and corrosion resistance by forming an oxynitride layer on a surface of the brake disc of heterogeneous materials, which includes a disc device and a hub device formed of cast iron and aluminum alloy materials through a cast-bonding method, and a brake disc of heterogeneous materials manufactured using the same.

Description of Related Art

In general, a brake disc of a vehicle includes a hub device connected to a driveshaft, and a disc device configured for generating frictional force due to contact with a friction material.

Because the disc device converts kinetic energy into thermal energy by generating frictional force, properties including excellent abrasion resistance and excellent heat resistance are required. To meet these requirements, a cast-iron material having the above excellent properties is primarily used for the disc device.

However, in recent years, due to exhaustion of oil energy and climate change, worldwide automobile manufacturers have made great efforts to develop different technology for improving fuel efficiency of a vehicle. To improve fuel efficiency, technology configured for reducing a weight of the vehicle without deteriorating the overall performance thereof have attracted attention.

Among them, technology for reducing the weight of the brake disc without deteriorating the performance thereof have been developed. Specifically, technology for reducing the weight of the vehicle by manufacturing a brake disc of heterogeneous materials in which a disc device, which directly generates friction, is formed of a cast-iron material using conventional means, but a hub device, configured for connecting the disc device to the driveshaft, formed of an aluminum alloy material has recently been spotlighted.

A conventional brake disc formed of a single material, e.g., cast iron, is subjected to a surface treatment, e.g., an oxynitriding process of forming an oxynitride layer on the surface of the brake disc at a high temperature of approximately 600° C., thus preventing deterioration of durability and corrosion resistance of the cast iron caused by exposure to moisture and oxygen in the atmosphere.

However, in the case of applying a conventional oxynitriding process to the light-weight brake disc formed of heterogeneous materials, there is a problem in that the hub device is damaged at high temperatures, making surface treatment impossible.

Furthermore, in the case of performing an oxynitriding process after a casting process with respect to the disc device, an additional heat treatment process for removing residual stress from the disc device formed of cast iron through the casting process may be performed before the oxynitriding process, increasing the total number of processes and manufacturing costs.

The information disclosed in this Background of the Invention section is only for enhancement of understanding of the general background of the invention and may not be taken as an acknowledgement or any form of suggestion that this information forms the related art already known to a person skilled in the art.

BRIEF SUMMARY

Various aspects of the present invention are directed to providing a method of manufacturing a brake disc of heterogeneous materials, which is configured for reducing the weight and improving durability and corrosion resistance by forming an oxynitride layer on the brake disc of heterogeneous materials, including cast iron and aluminum alloy materials, and a brake disc of heterogeneous materials manufactured using the same.

Various aspects of the present invention are directed to providing a method of manufacturing the brake disc of heterogeneous materials, which is configured for forming an oxynitride layer on a hub device of an aluminum alloy material while preventing the hub device from being deformed or damaged, and a brake disc of heterogeneous materials manufactured using the same.

In accordance with an aspect of the present invention, the above and other objects can be accomplished by the provision of a method of manufacturing a brake disc of heterogeneous materials, including a disc device and a hub device formed in a cast-bonding manner using different materials, the method including performing a first casting for casting the disc device using a grey cast-iron material, performing a preparation by placing the disc device in a casting mold as an insert, performing a second casting for preparing a brake disc cast product by injecting molten aluminum alloy into the casting mold and casting the hub device to be cast-bonded to the disc device, and performing an oxynitriding process for forming an oxynitride layer on the brake disc cast product by smoothing a surface of the brake disc cast product and performing heat treatment in a gaseous atmosphere at a temperature ranging from 425 to 500° C.

Performing the oxynitriding may include forming the oxynitride layer on the surface of the brake disc cast product by performing the heat treatment for a time ranging from 7 to 15 hours.

Performing the oxynitriding may include forming the oxynitride layer to a thickness ranging from 1 to 15 μm.

The method may further include performing a preheating, before performing the preparation, for preheating the disc device to a temperature ranging from 445 to 520° C., wherein the temperature in the preheating is higher than the temperature of the heat treatment in the oxynitriding process.

The method may further include performing an ending process, after the oxynitriding process, for compensating for a variation in disc thickness and a potential run-out by processing the hub device.

Performing the ending process may include processing the hub device wherein the disc thickness variation is 7 μm or less and the run-out is 30 μm or less.

Various aspects of the present invention are directed to providing a brake disc of heterogeneous materials, including a disc device including a grey cast-iron material, a hub device including an aluminum alloy material integrally formed with the disc device in cast-bonding way, and an oxynitride layer formed on a surface of the disc device.

The oxynitride layer may be formed on the surface of the disc device to a thickness ranging from 1 to 15 μm.

The hub device may have a disc thickness variation of 7 μm or less and a run-out of 30 μm or less.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
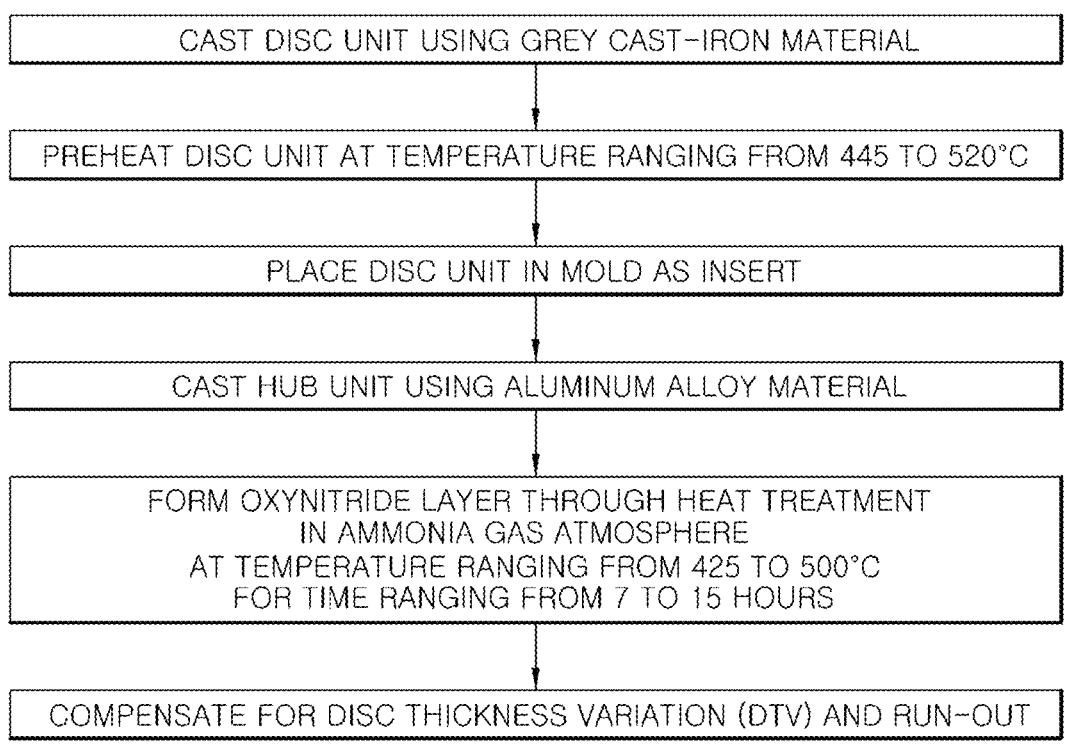
FIG. 1 is a flowchart showing a method of manufacturing a brake disc of heterogeneous materials according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included with in the spirit and scope of the invention as defined by the appended claims.

Figure 2:
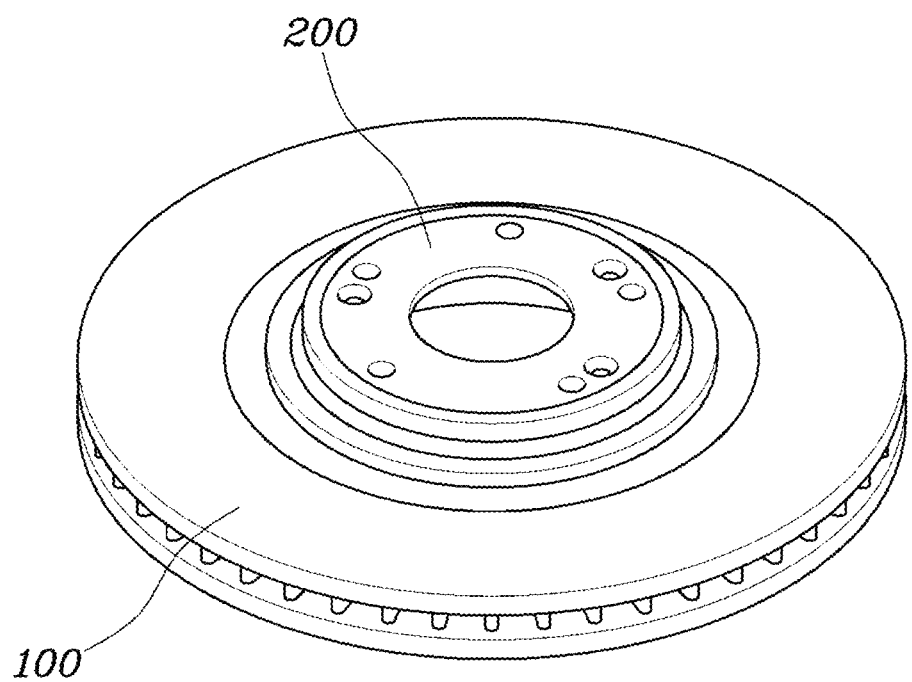
FIG. 2 is a perspective view of a brake disc of heterogeneous materials manufactured according to an exemplary embodiment of the present invention.
Figures 3, 4:
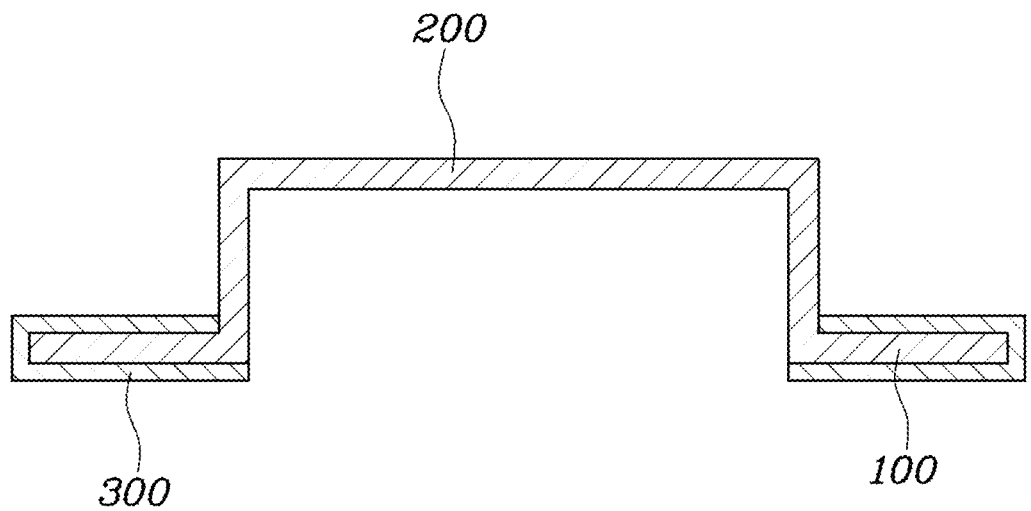
FIG. 3 is a sectional view of the brake disc of heterogeneous materials manufactured according to an exemplary embodiment of the present invention.
FIG. 4 is a view showing a comparison between brake discs of heterogeneous materials manufactured under various oxynitriding conditions according to an exemplary embodiments of the present invention and a brake disc of heterogeneous materials according to a comparative example.

FIG. 1 is a flowchart showing a method of manufacturing a brake disc of heterogeneous materials according to an exemplary embodiment of the present invention, FIG. 2 is a perspective view of the brake disc of heterogeneous materials manufactured according to the exemplary embodiment of the present invention, and FIG. 3 is a sectional view of the brake disc of heterogeneous materials manufactured according to the exemplary embodiment of the present invention.

As shown in FIG. 1, FIG. 2, and FIG. 3, a method of manufacturing the brake disc of heterogeneous materials according to an exemplary embodiment of the present invention includes a first casting step of casting a disc device 100, a preparation step of inserting the cast disc device 100 into a mold, a second casting step of forming a brake disc cast product by casting a hub device 200 which is cast-bonded to the disc device 100, and an oxynitriding step of forming an oxynitride layer 300 on a surface of the disc device 100.

The first casting step includes casting the disc device 100, in which the disc device 100 is manufactured using various common casting methods. For example, the disc device 100 may be manufactured by tapping molten grey cast iron, performing spheroidizing with respect to the same, injecting the same into a sand mold having a shape of the disc device 100, and cooling the same.

Because the disc device 100 is a component that generates frictional force due to contact with a high friction material, the disc device 100 requires properties including excellent abrasion resistance and excellent heat resistance. Accordingly, the disc device 100 may be formed of grey cast iron.

As described above, the disc device 100 is placed in a casting mold as an insert in the preparation step, preparing the disc device 100 for the second casting step.

The method of manufacturing the brake disc of heterogeneous materials according to an exemplary embodiment of the present invention may further include a pre-treatment step of surface-treating the surface of the disc device 100 using a grinding process, e.g., rough grinding, before the preparation step.

When the preparation step is completed, in the second casting step molten aluminum alloy, which is prepared by being heated to a temperature ranging from 650 to 750° C., is injected into a mold to form the brake disc cast product in which the hub device 200 is cast-bonded to the disc device 100.

In the second casting step according to an exemplary embodiment of the present invention, the brake disc cast product is formed using a gravity-casting or squeeze-casting method. The reason for the above methods is that the gravity-casting or squeeze-casting enables a cast-bonded portion to have higher durability compared to other casting methods.

When the injection of the molten aluminum alloy is completed, the product is cooled for a predetermined time, ranging from 60 to 500 seconds, coagulating the hub device 200. The coagulated hub device 200 is removed from the mold, completing the manufacturing of the brake disc cast product.

As described above, after the brake disc cast product is completely manufactured, the oxynitriding step may occur wherein the brake disc cast product is subjected to a surface smoothing using a finishing or grinding method, and the oxynitride layer 300 is then formed on the surface of the disc device 100.

At the present time, because the hub device 200 of the aluminum alloy material has an aluminum oxide film formed on the surface thereof, the oxynitride layer is not formed thereon.

Describing the oxynitriding step in more detail, the surface-treated brake disc cast product is placed into a nitriding furnace, ammonia gas ($NH_3$) is injected forming an ammonia gas ($NH_3$) atmosphere, a temperature is raised to a level ranging from 425 to 500° C., and the present state is maintained for a time ranging from 7 to 15 hours, completely forming the nitride layer on the surface of the disc device 100.

Various gases or gas mixtures other than ammonia gas ($NH_3$), e.g., nitrogen gas ($N_2$) or nitrous oxide ($N_2O$) which include nitrogen to form a nitride layer may be used as the atmosphere gas, and the internal pressure of the nitriding furnace may be maintained in the range of 50 to 300 mbar.

FIG. 4 is a view showing a comparison between brake discs of heterogeneous materials manufactured under various oxynitriding conditions according to exemplary embodiments of the present invention as well as a brake disc of heterogeneous materials according to a comparative example.

As shown in FIG. 4, a conventional brake disc of a single material, e.g., cast iron, can be subjected to oxynitriding treatment at a high temperature ranging from 550 to 600° C. However, when the brake disc of heterogeneous materials, e.g., cast iron and aluminum alloy materials, is subjected to oxynitriding treatment at a temperature higher than 500° C., a problem in which a hub device formed of an aluminum alloy material melts occurs, as shown in Comparative Example 1.

The melting point of pure aluminum is approximately 660° C., but the melting point of the aluminum alloy used for the hub device 200 is lower than 660° C., thus causing thermal damage to the hub device 200 at a temperature over 500° C.

Therefore, according to an exemplary embodiment of the present invention, the oxynitriding treatment may be performed at a low temperature of 500° C. or less to form a nitride layer while preventing the hub device 200 of an aluminum alloy material from melting.

The oxynitriding step according to the exemplary embodiment of the present invention is performed at a temperature of 425° C. or more. The reason for the provided temperature is that the formation of the nitride layer is not smoothly achieved and takes a long time at a temperature below 425° C. and thus productivity deteriorates. Therefore, it is preferable for the temperature to be limited to a level ranging from 425 to 500° C.

At the present time, heat treatment may preferably be performed for a time ranging from 7 to 15 hours in the oxynitriding step. The reason for the provided time period is to enable the nitride layer formed according to the exemplary embodiment of the present invention to have a thickness ranging from 1 to 15 μm. When the heat treatment is performed for less than 7 hours, the nitride layer is formed at a thickness that does not satisfy the reference range, i.e. to a thickness below 1 μm. When the heat treatment is performed for greater than 15 hours, a long time period is required to perform the oxynitriding step, which deteriorates productivity and increases manufacturing costs. Therefore, limiting the heat treatment time to the aforementioned range is preferable.

As described above, when the nitriding layer ($Fe_{2-3}N$) is formed, the internal gas is discharged from the nitriding furnace, and the brake disc of heterogeneous materials, on which the nitride layer is formed, is removed from the nitriding furnace and cooled under atmospheric conditions.

At the present time, the brake disc of heterogeneous materials comes into contact with oxygen in the atmosphere, and forms an oxide layer ($Fe_3O_4$), which prevents further oxidation, on the nitride layer. Consequently, the oxynitride layer 300, in which the oxide layer is stacked on the nitride layer, is formed, improving the corrosion resistance and durability of the brake disc.

The method of manufacturing a brake disc of heterogeneous materials according to the exemplary embodiment of the present invention may further include a preheating step of preheating the disc device to a temperature ranging from 445 to 520° C. before the preparation step.

The above preheating allows the molten aluminum to completely occupy a cast-bonded portion due to quenching of the molten aluminum, caused by contact with the disc device 100 in the second casting step, and also removes residual stress from the disc device 100 of a grey cast-iron material. Therefore, an additional heat treatment process for removing residual stress from the disc device 100 is unnecessary, thus improving productivity and reducing manufacturing costs.

At the present time, the preheating temperature in the preheating step may be higher than the heat treatment temperature in the oxynitriding step.

The reason for the above temperatures is to prevent thermal deformation of the disc device 100 due to the heat treatment temperature in the oxynitriding step being higher than the preheating temperature. That is, the disc device 100 is thermally deformed by being preheated at a temperature higher than the heat treatment temperature in the oxynitriding step, but is prevented from being further thermally deformed in the oxynitriding treatment by performing the oxynitriding treatment at a temperature lower than the preheating temperature.

At the present time, the thermal deformation of the disc device 100, which has occurred in the preheating step, is corrected by a finishing or grinding process in the oxynitriding step.

In addition, the method of manufacturing the brake disc of heterogeneous materials according to an exemplary embodiment of the present invention may further include an ending step of compensating for a disc thickness variation (DTV) and a run-out by processing the hub device 200 after the oxynitriding step. At the present time, a modification processing may occur with respect to the hub device 200 on the basis of the braking surface of the disc device 100.

Table 1 shows the results of measuring the disc thickness variation (DTV) and the run-out before and after processing in the ending step with respect to hub devices 200 according to various exemplary embodiments of the present invention.

TABLE 1

| Classification | DTV (μm) | | Outboard Run-out (μm) | | Inboard Run-out (μm) | |
|---|---|---|---|---|---|---|
| | Before Processing | After Processing | Before Processing | After Processing | Before Processing | After Processing |
| Embodiment 1 | 4.9 | 6.3 | 68.8 | 14.2 | 68.8 | 14.2 |
| Embodiment 2 | 11.3 | 6.3 | 210 | 25.6 | 216 | 24.1 |
| Embodiment 3 | 11.8 | 6.6 | 214.6 | 17.6 | 216.7 | 15.1 |

As seen from Table 1, the disc thickness variation (DTV) and the run-out of the hub device 200 after the oxynitriding treatment are relatively large, but the disc thickness variation (DTV) is decreased below 7 μm and the run-out is decreased below 30 μm after the modification processing with respect to the hub device 200 in the ending step, satisfying the required operational stability and noise/vibration characteristics.

Figure 5:
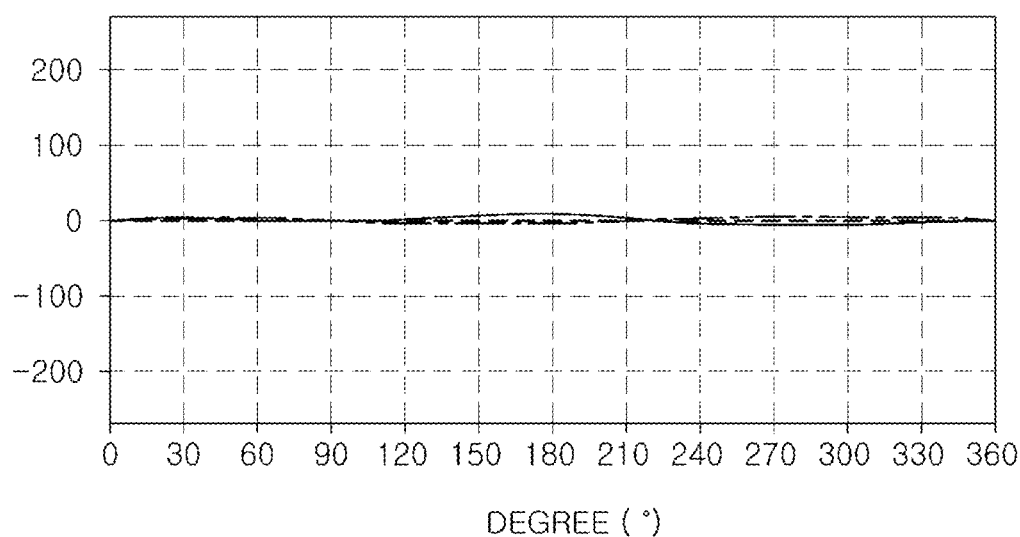
FIG. 5 and FIG. 6 are graphs showing the results of a durability experiment conducted on the brake disc of heterogeneous materials manufactured according to an exemplary embodiment of the present invention.
Figure 6:
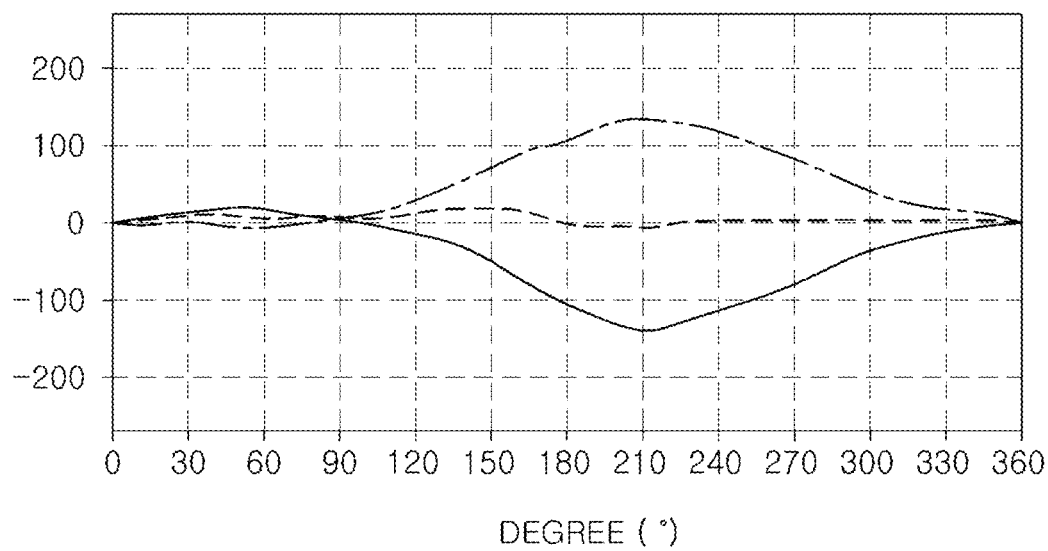
Figure 7:
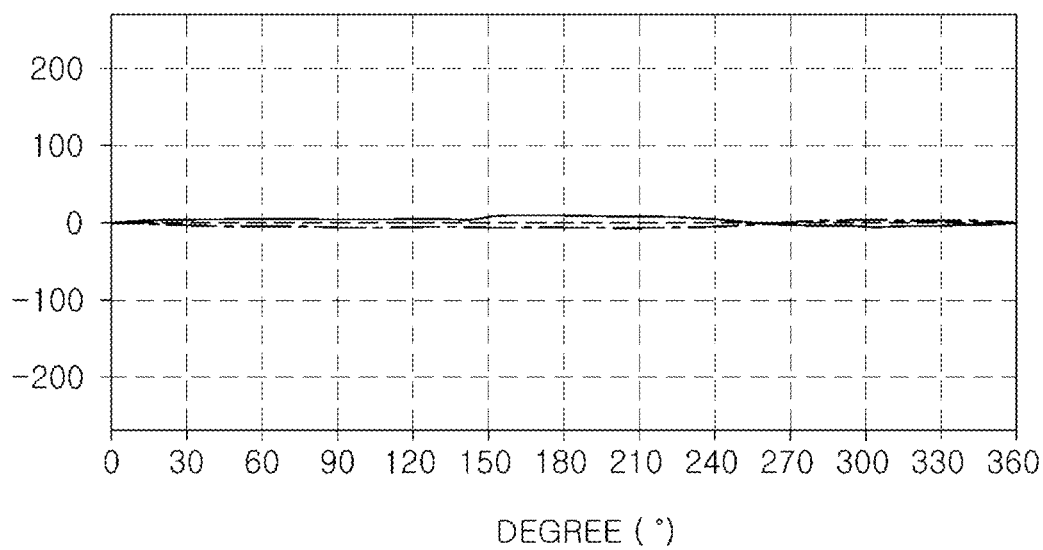
FIG. 7 and FIG. 8 are graphs showing the results of a durability experiment conducted on a brake disc of heterogeneous materials that has no oxynitride layer.
Figure 8:
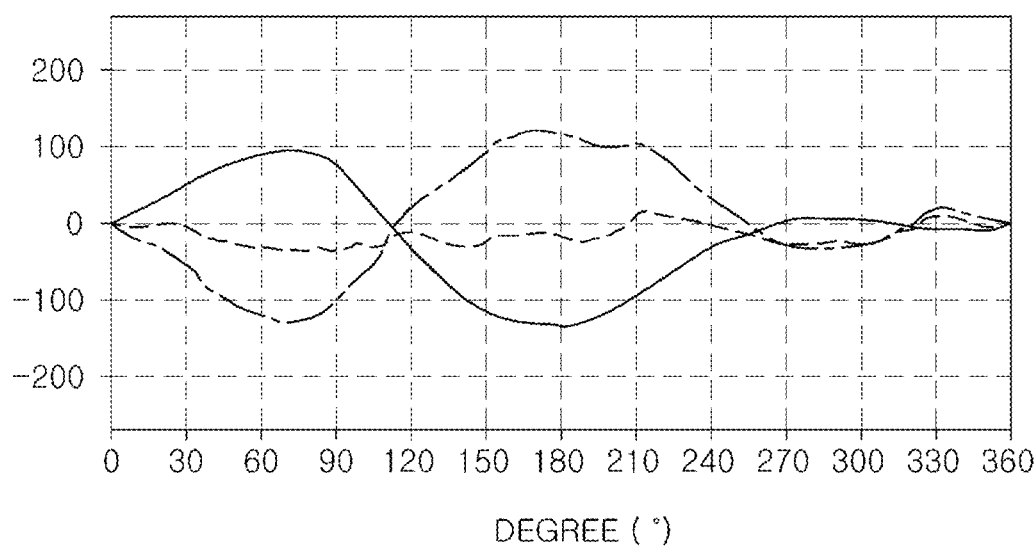

FIG. 5 and FIG. 6 are graphs showing the results of a durability experiment conducted on the brake disc of heterogeneous materials manufactured according to an exemplary embodiment of the present invention. FIG. 7 and FIG. 8 are graphs showing the results of a durability experiment conducted on a brake disc of heterogeneous materials that has no oxynitride layer.

TABLE 2

| Classification | Braking Speed (km/h) | Deceleration (g) | Number of Braking Operations |
|---|---|---|---|
| Deceleration | 200 → 70 | 0.5 | 9 |
| Stop | 200 → 0 | 1 | 1 |

Table 2 shows durability experiment conditions, and in an exemplary embodiment of the present invention, the durability experiment was conducted while repeating the above cycle four times.

TABLE 3

| Classification | | Embodiment | | Comparative Example | |
|---|---|---|---|---|---|
| | | Before | After | Before | After |
| Run-out (μm) | O/B | 15.8 | 171.3 | 15.2 | 252.4 |
| | I/B | 13.7 | 156.4 | 14.5 | 277.4 |
| DTV (μm) | | 2.8 | 29.1 | 2.7 | 54.5 |

Table 3 shows the experimental results (refer to FIG. 5, FIG. 6, FIG. 7, and FIG. 8) of measuring a change in the run-out after conducting the durability experiments under the same conditions with respect to the brake disc of heterogeneous materials manufactured according to various embodiments of the present invention and the conventional brake disc of heterogeneous materials that has no oxynitride layer.

As seen from FIG. 5, FIG. 6, FIG. 7, and Table 3, the conventional brake disc of heterogeneous materials that has no oxynitride layer according to the comparative exemplary embodiment and the brake disc of heterogeneous materials that has the oxynitride layer 300 according to an exemplary embodiment of the present invention have similar disc thickness variations and similar run-outs when they are initially manufactured.

However, as seen from FIG. 6, FIG. 8, and Table 3, after the durability experiments are conducted under the same conditions, the brake disc of heterogeneous materials manufactured according to an exemplary embodiment of the present invention has greatly improved durability compared to the brake disc of the comparative example. After the durability experiment, the run-out of the brake disc according to an exemplary embodiment of the present invention is at least 30% lower than that of brake disc of the comparative example, and the disc thickness variation of the brake disc according to an exemplary embodiment of the present invention is at least 45% lower than that of the brake disc of the comparative example.

Hereinafter, the brake disc of heterogeneous materials manufactured according to the exemplary embodiment of the present invention will be described with reference to the accompanying drawings.

As shown in FIG. 2 and FIG. 3, the brake disc of heterogeneous materials according to the exemplary embodiment of the present invention includes the disc device 100 including a grey cast-iron material and the hub device 200 including an aluminum alloy material. The disc device 100 and the hub device 200 are formed integrally with each other in a cast-bonding manner. The oxynitride layer 300 is formed on the surface of the disc device 100.

At the present time, it is preferable for the oxynitride layer 300 to be formed on the surface of the disc device 100 to a thickness ranging from 1 to 15 μm. The present range is because when the thickness is less than 1 μm improvement of corrosion resistance and durability is minimal, and when the thickness is greater than 15 μm, manufacturing costs and time increase greatly, and productivity deteriorates.

In addition, the hub device 200 in an exemplary embodiment of the present invention may be formed having a disc thickness variation (DTV) of 7 μm or less and a run-out of 30 μm or less to ensure stable rotation of the brake disc and to satisfy the required noise/vibration characteristics and operational stability.

As is apparent from the above description, according to an exemplary embodiment of the present invention, it is possible to prevent the hub device including an aluminum alloy material, which has a relatively low melting point, from being deformed or damaged by forming an oxynitride layer at a temperature of 500° C. or less.

In addition, it is possible to improve the durability and corrosion resistance and reduce the total weight by forming an oxynitride layer on the surface of the brake disc of heterogeneous materials.

In addition, since an additional heat treatment process for removing residual stress from the disc device including a cast-iron material is unnecessary, it is possible to reduce manufacturing costs and time while increasing productivity.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of manufacturing a brake disc of heterogeneous materials, including a disc device and a hub device formed in a cast-bonding manner using different materials, the method comprising:
    performing a first casting for casting the disc device using a grey cast-iron material;
    performing a preparation step by placing the disc device in a casting mold as an insert;
    performing a second casting for preparing a brake disc cast product by injecting molten aluminum alloy into the casting mold and casting the hub device to be cast-bonded to the disc device; and
    performing an oxynitriding process for forming an oxynitride layer by smoothing a surface of the brake disc cast product and performing a heat treatment in a gaseous atmosphere at a temperature ranging from 425 to 500° C.

2. The method according to claim 1, wherein performing the oxynitriding process includes forming the oxynitride layer on the surface of the brake disc cast product by performing the heat treatment for a time period ranging from 7 to 15 hours.

3. The method according to claim 1, wherein performing the oxynitriding process includes forming the oxynitride layer to a thickness ranging from 1 to 15 μm.

4. The method according to claim 1, further including:
    performing a preheating process, before performing the preparation step, for preheating the disc device at a temperature which is higher than the temperature of the heat treatment in performing the oxynitriding.

5. The method according to claim 4, wherein the temperature in performing the preheating ranges from 445 to 520° C.

6. The method according to claim 1, further including:
    performing an ending process, after performing the oxynitriding process, for compensating for a disc thickness variation and a run-out by processing the hub device.

7. The method according to claim 6, wherein performing the ending process includes processing the hub device wherein the disc thickness variation is 7 μm or less and the run-out is 30 μm or less.

* * * * *